United States Patent
Miyahara

(10) Patent No.: US 12,160,656 B2
(45) Date of Patent: Dec. 3, 2024

(54) IMAGE CAPTURING APPARATUS, METHOD FOR CONTROLLING THE SAME, AND STORAGE MEDIUM

(71) Applicant: CANON KABUSHIKI KAISHA, Tokyo (JP)

(72) Inventor: Kazuya Miyahara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 18/160,584

(22) Filed: Jan. 27, 2023

(65) Prior Publication Data

US 2023/0254571 A1    Aug. 10, 2023

(30) Foreign Application Priority Data

Feb. 8, 2022   (JP) .................... 2022-018106

(51) Int. Cl.
| | |
|---|---|
| *H04N 23/62* | (2023.01) |
| *H04N 5/76* | (2006.01) |
| *H04N 23/66* | (2023.01) |
| *H04N 23/667* | (2023.01) |
| *H04N 23/69* | (2023.01) |
| *H04N 23/695* | (2023.01) |

(52) U.S. Cl.
CPC .............. *H04N 23/62* (2023.01); *H04N 5/76* (2013.01); *H04N 23/66* (2023.01); *H04N 23/667* (2023.01); *H04N 23/69* (2023.01); *H04N 23/695* (2023.01)

(58) Field of Classification Search
CPC .......... H04N 23/62; H04N 5/76; H04N 23/66; H04N 23/667; H04N 23/69; H04N 23/695; H04N 23/6812; H04N 23/685; H04N 23/661
See application file for complete search history.

(56) References Cited

U.S. PATENT DOCUMENTS

| | | | | |
|---|---|---|---|---|
| 9,866,743 | B2 * | 1/2018 | Kamada | H04N 23/66 |
| 2019/0199916 | A1 * | 6/2019 | Kadoi | G06V 40/161 |
| 2021/0099640 | A1 * | 4/2021 | Mizobuchi | H04N 23/69 |
| 2022/0132025 | A1 * | 4/2022 | Kawakami | H04N 23/64 |

FOREIGN PATENT DOCUMENTS

| | | | | |
|---|---|---|---|---|
| JP | 2017169214 A | * | 9/2017 | H04N 5/232 |
| JP | 2020145556 A | | 9/2020 | |

* cited by examiner

*Primary Examiner* — Nhan T Tran
(74) *Attorney, Agent, or Firm* — Canon U.S.A., Inc., IP Division

(57) ABSTRACT

An image capturing apparatus includes an operation member that receives an operation from a user, an image capturing unit including a first function of performing still image capturing when a first operation on the operation member is received, a second function of starting moving image recording when a second operation on the operation member is received, and a third function of automatically starting moving image recording, and a control unit configured to, when the first operation is received via the operation member while the third function is performed, perform control to stop the moving image recording by the third function and perform the still image capturing by the first function, and when the first operation is received via the operation member while the second function is performed, perform control to stop the moving image recording by the second function and not perform the still image capturing by the first function.

16 Claims, 10 Drawing Sheets

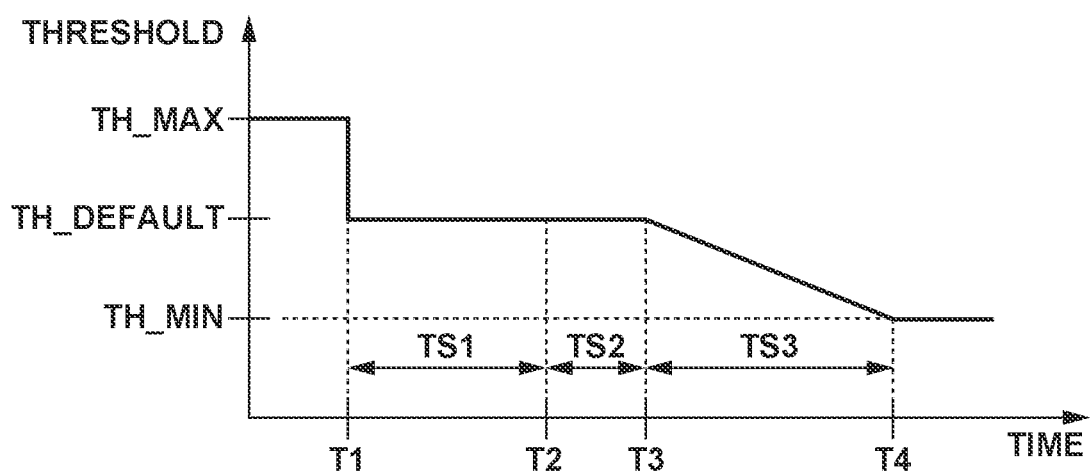

IMAGE CAPTURING APPARATUS, METHOD FOR CONTROLLING THE SAME, AND STORAGE MEDIUM

BACKGROUND

Field

The present disclosure relates to an image capturing apparatus, a method for controlling the image capturing apparatus, and a storage medium.

Description of the Related Art

In recent years, a digital camera (a life-log camera) has been known to automatically capture an image at an appropriate timing even if a user does not explicitly provide an instruction. To enable such a camera to capture an image at a timing intended by the user, the camera is provided with a function of performing image capturing processing upon receipt of an instruction from the user. For example, Japanese Patent Application Laid-Open No. 2020-145556 discusses a life-log camera having a manual image capturing function in addition to an automatic image capturing function. Such a life-log camera is capable of automatically and manually capturing still images as well as moving images.

The above-described life-log camera is assumed to be carried for a long period of time while, for example, hanging from the user's neck or worn on a part of the user's body. For this reason, it is common that the portability is highly valued. Accordingly, the user can use a single button to issue instructions for performing a plurality of image capturing functions, such as switching on or off the automatic image capturing, and starting and ending the manual still image and moving image capturing. To enable the camera to distinguishably perform the plurality of image capturing functions via operations on the single button, in some cases, more complicated operations than simply pressing the button may be required, such as pressing the button twice in quick succession and holding down the button for a predetermined period of time, so that the function to be performed is distinguished. In addition, the same operation is assumed to trigger different types of processing depending on the situation. As a result, the user needs to perform complicated operations to start and end appropriate processing at the timing intended by the user, which can sometimes make the user feel troublesome.

SUMMARY

According to an aspect of the present disclosure, an image capturing apparatus includes an operation member configured to receive an operation from a user, an image capturing unit including a first function of performing still image capturing in a case where a first operation on the operation member is received, a second function of starting moving image recording in a case where a second operation on the operation member is received, and a third function of automatically starting moving image recording, and a control unit configured to, in a case where the first operation is received via the operation member while the third function is performed, perform control to stop the moving image recording by the third function and perform the still image capturing by the first function, and in a case where the first operation is received via the operation member while the second function is performed, perform control to stop the moving image recording by the second function and not perform the still image capturing by the first function.

Further will become apparent from the following description of exemplary embodiments with reference to the attached drawings.

BRIEF DESCRIPTION OF THE DRAWINGS

FIGS. 7A to 7D are diagrams illustrating image capturing frequency control.

DESCRIPTION OF THE EMBODIMENTS

An exemplary embodiment will be described in detail below with reference to the accompanying drawings.

<Camera Configuration>

Figure 1A:
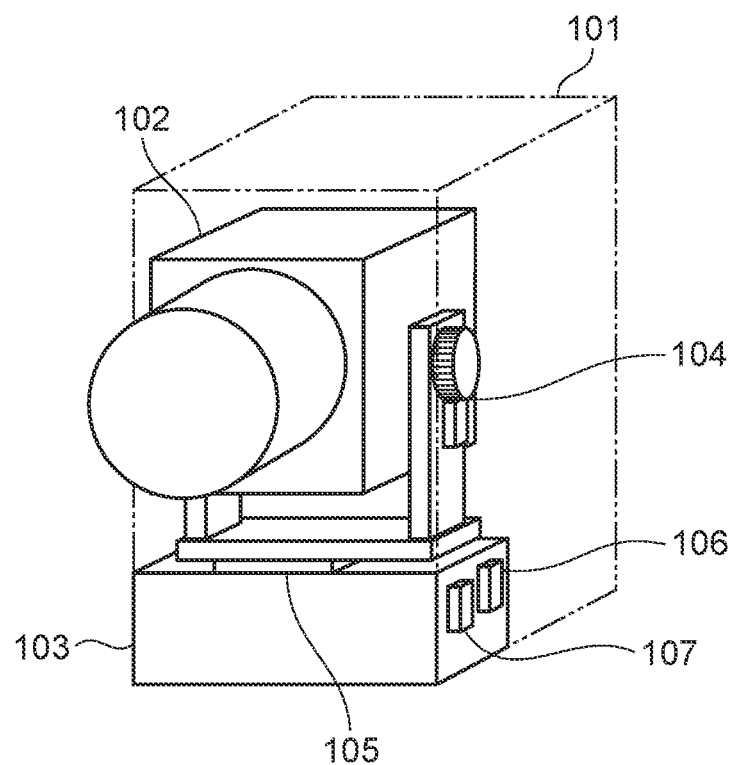
FIG. 1A is a schematic diagram illustrating an outer appearance of a camera that is an image capturing apparatus according to an exemplary embodiment.

FIG. 1A schematically illustrates an outer appearance of a camera 101 that is an image capturing apparatus according to an exemplary embodiment.

The camera 101 illustrated in FIG. 1A includes a power switch and operation members (not illustrated) that enable the user to operate the camera 101. A lens barrel 102 includes a lens group and an image sensor (not illustrated) as an imaging optical system for capturing a subject image, and is movably attached to a fixing portion 103 of the camera 101. More specifically, the lens barrel 102 is attached to the fixing portion 103 via a tilt rotation unit 104 and a pan rotation unit 105, which are mechanisms that can be rotatably driven with respect to the fixing portion 103.

Figure 1B:
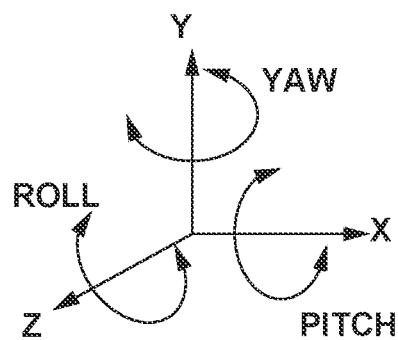
FIG. 1B is a diagram illustrating three-axis directions of the camera according to the exemplary embodiment.

The tilt rotation unit 104 includes a motor drive mechanism (not illustrated) for rotatably driving the lens barrel 102 in a pitch direction illustrated in FIG. 1B. The pan rotation unit 105 includes a motor drive mechanism (not illustrated) for rotatably driving the lens barrel 102 in a yaw direction illustrated in FIG. 1B. In other words, the camera 101 includes mechanisms for rotatably driving the lens barrel 102 in two-axis directions. Each axis illustrated in FIG. 1B is defined with respect to the position of the fixing portion 103. An angular speedometer 106 and an accelerometer 107 are disposed on the fixing portion 103 of the camera 101. When a vibration of the camera 101 is detected based on output signals of the angular speedometer 106 and the accelerometer 107, the tilt rotation unit 104 and the pan rotation unit 105 are rotatably driven, so that a shake or tilt of the lens barrel 102 can be corrected. The angular speedometer 106 and the accelerometer 107 also detect a movement of the camera 101 based on measurement results in a predetermined period of time.

Figure 2:
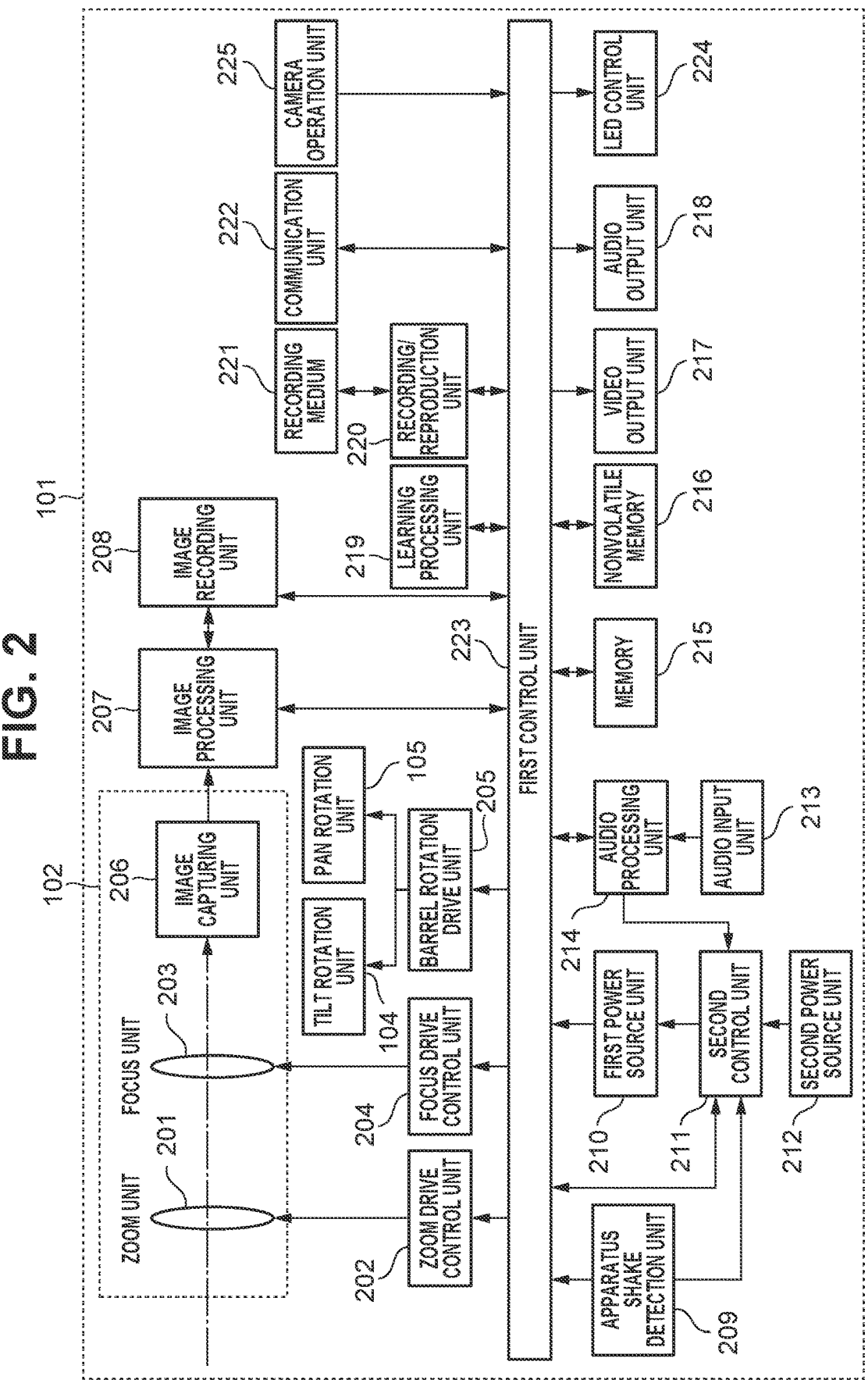
FIG. 2 is a block diagram illustrating an overall configuration of the camera according to the exemplary embodiment.

FIG. 2 is a block diagram illustrating an overall configuration of the camera 101 according to the present exemplary embodiment. A first control unit 223 includes, for example, a central processing unit CPU (a micro processing unit (MPU)) and memories (a dynamic random access memory (DRAM) and a static RAM (SRAM)). The first control unit 223 performs various types of processing to control the blocks of the camera 101 and control data transfer between the blocks according to a program stored in a nonvolatile memory (an electrically erasable programmable read only memory (EEPROM)) 216. The nonvolatile memory 216, which is an electrically erasable and recordable memory, stores constants and programs for operations of the first control unit 223.

A zoom unit 201 includes a zoom lens for performing magnification (enlargement or reduction) of a formed subject image. A zoom drive control unit 202 controls driving of the zoom unit 201 and detects a focal length in this control. A focus unit 203 includes a focus lens for performing focus adjustment. A focus drive control unit 204 controls driving of the focus unit 203. An image capturing unit 206 including an image sensor receives incident light through each lens group and outputs, as an analog image signal, electric charge information corresponding to the amount of the received light to an image processing unit 207. The zoom unit 201, the focus unit 203, and the image capturing unit 206 are disposed in the lens barrel 102.

The image processing unit 207 applies image processing, such as distortion correction, white balance adjustment, and color interpolation processing, to digital image data obtained through analog-to-digital (AD) conversion of the analog image signal, and outputs digital image data after the application of the image processing. The digital image data output from the image processing unit 207 is converted into a recording format such as the Joint Photographic Experts Group (JPEG) format by an image recording unit 208 and then stored in a memory 215 or transmitted to a video output unit 217 (described below). The function of the image processing unit 207 can be incorporated into the first control unit 223.

A barrel rotation drive unit 205 drives the tilt rotation unit 104 and the pan rotation unit 105 to rotate the lens barrel 102 in the tilt and pan directions, respectively. The barrel rotation drive unit 205 is an electronic circuit for controlling each of the tilt rotation unit 104 and the pan rotation unit 105. The function of the barrel rotation drive unit 205 can be incorporated into the first control unit 223.

An apparatus shake detection unit 209 includes the angular speedometer (or gyro sensor) 106 for detecting the angular velocity in three-axis directions of the camera 101 and the accelerometer (or acceleration sensor) 107 for detecting the acceleration in three-axis directions of the camera 101. The apparatus shake detection unit 209 calculates the rotational angle and the shift amount of the camera 101 based on the signals detected by these sensors.

An audio input unit 213 acquires audio signals in the vicinity of the camera 101 using a microphone (not illustrated) provided in the camera 101, converts the audio signals into digital audio signals, and transmits the digital audio signals to an audio processing unit 214. The audio processing unit 214 is a digital signal processing circuit that performs audio processing, such as optimizing processing, on the input digital audio signals. The audio signals processed by the audio processing unit 214 are transmitted to the memory 215 by the first control unit 223. The memory 215 temporarily stores the image signals and the audio signals obtained by the image processing unit 207 and the audio processing unit 214, respectively. The function of the audio processing unit 214 can be incorporated into the first control unit 223.

The image processing unit 207 reads the image signals temporarily stored in the memory 215, and encodes the image signals to generate compressed image signals. The audio processing unit 214 reads the audio signals temporarily stored in the memory 215, and encodes the audio signals to generate compressed audio signals. The first control unit 223 transmits these compressed image and audio signals to a recording/reproduction unit 220.

The recording/reproduction unit 220 is a digital signal processing circuit that records the compressed image and audio signals generated by the image processing unit 207 and the audio processing unit 214, respectively, and other image capturing control data into a recording medium 221. In a case where the audio signals are not compressed through encoding, the first control unit 223 transmits the audio signals generated by the audio processing unit 214 and the compressed image signals generated by the image processing unit 207 to the recording/reproduction unit 220 to record these signals into the recording medium 221. The function of the recording/reproduction unit 220 can be incorporated into the first control unit 223.

The recording medium 221 can integrated in the camera 101 or detachably attached to the camera 101, and can store the compressed image signals, compressed audio signals, audio signals, and other various types of data generated by the camera 101. Generally, a medium having a larger capacity than the nonvolatile memory 216 is used as the recording medium 221. Examples of the recording medium 221 include various types of recording media such as a hard disk, an optical disk, a magneto-optical disk, a compact disc recordable (CD-R), a digital versatile disc recordable (DVD-R), a magnetic tape, a nonvolatile semiconductor memory, and a flash memory, where the actual type of medium used is typically determined based on whether the recording medium is integrated in or detachably attached to the camera.

The recording/reproduction unit 220 reads (reproduces) the compressed image signals, compressed audio signals, audio signals, various types of data, and programs recorded in the recording medium 221. The first control unit 223 transmits the read compressed image signals and compressed audio signals to the image processing unit 207 and the audio processing unit 214, respectively. The image processing unit 207 and the audio processing unit 214 temporarily store the compressed image signals and the compressed audio signals into the memory 215, respectively, decode the stored signals in predetermined procedures, and transmit the decoded signals to the video output unit 217.

A plurality of microphones (not illustrated) is disposed on the audio input unit 213. The audio processing unit 214 can detect the sound direction with respect to the plane where the plurality of microphones is installed. The detected sound direction is used for a subject search and automatic image capturing, which will described below. The audio processing unit 214 further detects specific audio commands.

Some audio commands are pre-registered in the camera 101, and the user can register specific sounds in the camera 101. The audio processing unit 214 also performs audio scene recognition. In the audio scene recognition, the audio processing unit 214 determines an audio scene by using a network subjected to machine learning based on a large volume of audio data. For example, a network for detecting a specific scene, such as "cheering" "clapping" or "uttering", is set in the audio processing unit 214 to detect a specific audio scene or a specific audio command. Upon detection of a specific audio scene or a specific audio command, the audio processing unit 214 outputs a detection trigger signal to the first control unit 223 or a second control unit 211.

The second control unit 211 is provided separately from the first control unit 223 controlling the main system of the camera 101, and controls power to be supplied to the first control unit 223. A first power source unit 210 and a second power source unit 212 supply power for operating the first control unit 223 and the second control unit 211, respectively. When a power button on the camera 101 is pressed, power is initially supplied to both the first control unit 223 and the second control unit 211. As described below, the first control unit 223 controls the first power source unit 210 to turn off the power supply to the first control unit 223. Even while the first control unit 223 is not operating, the second control unit 211 is operating to receive information from the apparatus shake detection unit 209 and the audio processing unit 214. The second control unit 211 performs processing for determining whether to activate the first control unit 223 based on various kinds of received information. When the second control unit 211 determines to activate the first control unit 223, the second control unit 211 instructs the first power source unit 210 to supply power to the first control unit 223.

An audio output unit 218 outputs a preset audio pattern from a built-in speaker (not illustrated) of the camera 101, for example, during image capturing. A light emitting diode (LED) control unit 224 controls an LED (not illustrated) on the camera 101 to be lit based on a preset lighting pattern or a preset blinking pattern, for example, during image capturing. The video output unit 217 includes, for example, a video out terminal, and outputs an image signal for displaying a video image on an external display connected to the camera 101. The audio output unit 218 and the video output unit 217 can be a combined terminal such as a High-Definition Multimedia Interface (HDMI®) terminal.

Figure 3:
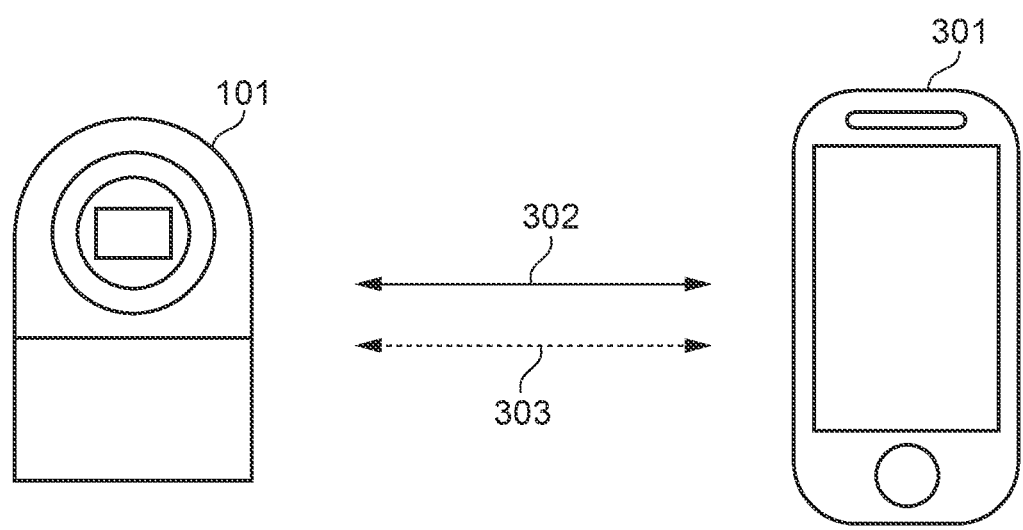
FIG. 3 is a diagram illustrating an example of a configuration of a wireless communication system including the camera and an external apparatus.

A communication unit 222 performs communication between the camera 101 and an external apparatus 301 (see FIG. 3). More specifically, the communication unit 222 transmits and receives data, such as audio signals, image signals, compressed audio signals, and compressed image signals, to and from the external apparatus 301. The communication unit 222 also receives image capturing start and end commands and control signals related to image capturing functions such as a pan function, a tilt function, and a zoom function, and drives the camera 101 based on an instruction from the external apparatus 301. Information such as various learning-related parameters to be processed by a learning processing unit 219 (described below) is also transmitted and received between the camera 101 and the external apparatus 301. The communication unit 222 includes, for example, a wireless communication module, such as an infrared communication module, a Bluetooth® communication module, a wireless local area network (LAN) communication module, a WirelessUSB® module, or a Global Positioning System (GPS) receiver.

As described below, the camera 101 according to the present exemplary embodiment can establish a wireless communication connection with the external apparatus 301 via the communication unit 222 according to a communication method using Bluetooth® and a communication method using wireless LAN.

A camera operation unit 225 includes operation buttons provided on the camera 101. The operation buttons include the power button for issuing an instruction to power on or off the camera 101, and a communication button for issuing an instruction to start wireless communication between the camera 101 and the external apparatus 301.

When the power button is operated, power is supplied to both the first control unit 223 and the second control unit 211, and processing associated with an image capturing operation sequence (described below) is started.

When the communication button is operated in a state where the power supply to the camera 101 is completed, processing for establishing a wireless communication connection between the camera 101 and the external apparatus 301 is performed. After the connection is established, various operations can be performed from a dedicated application on the external apparatus 301.

The camera 101 according to the present exemplary embodiment does not include a display.

<Communication with External Apparatus>

FIG. 3 illustrates an example of a configuration of a wireless communication system including the camera 101 and the external apparatus 301.

The camera 101 and the external apparatus 301 can communicate with each other via first communication 302 using a wireless LAN conforming to the Institute of Electrical and Electronics Engineers (IEEE) 802.11 standard series. The camera 101 and the external apparatus 301 can also communicate with each other via second communication 303 having a master-slave relation between a control station and a slave station, such as Bluetooth® Low Energy. Wireless LAN and Bluetooth® Low Energy are examples of communication methods. Each communication apparatus has at least two communication functions. For example, if one communication function that performs communication based on the relation between a control station and a slave station can control the other communication function, other communication methods can be used. It is assumed that the first communication 302, such as wireless LAN, enables higher-speed communication than the second communication 303, such as Bluetooth® Low Energy, and that the second communication 303 has at one or more of a lower power consumption or a shorter communicable distance than the first communication 302.

Figure 4:
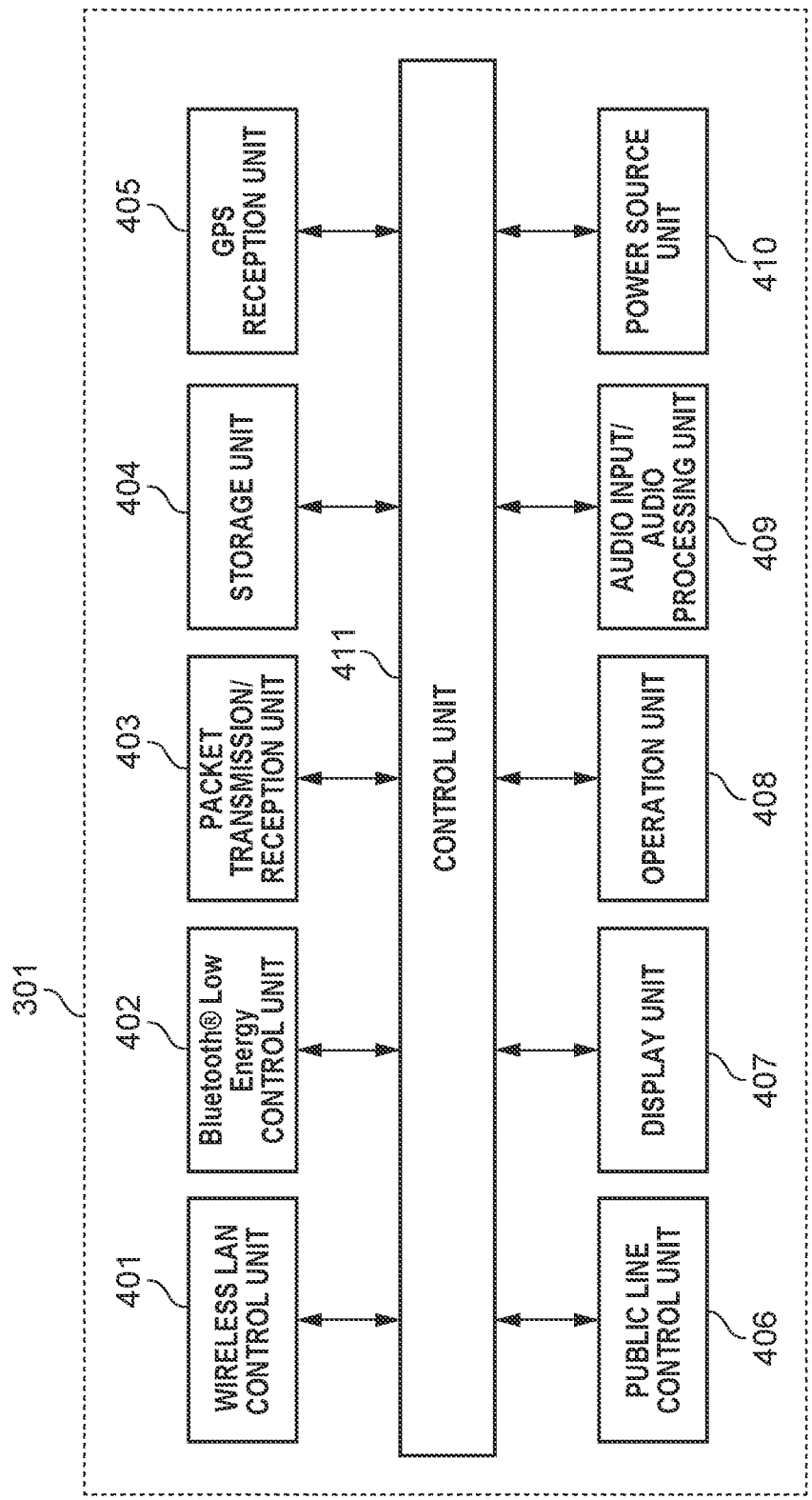
FIG. 4 is a block diagram illustrating a configuration of the external apparatus.

A configuration of the external apparatus 301 will now be described with reference to FIG. 4. The external apparatus 301 includes, for example, a public line control unit 406 for public wireless communication, a wireless LAN control unit 401 for wireless LAN communication, and a Bluetooth® Low Energy control unit 402 for Bluetooth® Low Energy communication. The external apparatus 301 also includes a packet transmission/reception unit 403. The wireless LAN control unit 401 performs radio frequency (RF) control and communication processing for wireless LAN, driver processing for performing various types of control for wireless LAN communication conforming to the IEEE 802.11 standard series, and protocol processing related to wireless LAN communication. The Bluetooth® Low Energy control unit 402 performs RF control and communication processing for Bluetooth® Low Energy, driver processing for performing various types of control for Bluetooth® Low Energy communication, and protocol processing related to Bluetooth® Low Energy communication.

The public line control unit 406 performs RF control and communication processing for public wireless communication, driver processing for performing various types of control for public wireless communication, and protocol processing related to public wireless communication. The public wireless communication conforms to, for example, the International Multimedia Telecommunication (IMT) standard or the Long Term Evolution (LTE) standard. The packet transmission/reception unit 403 performs processing for one or more of packet transmission or packet reception related to wireless LAN communication, Bluetooth® Low Energy communication, and public wireless communication. In the present exemplary embodiment, the external apparatus 301 is described to perform at least one of packet transmission and packet reception in communication. In another exemplary embodiment, communication methods other than packet switching, such as line switching, can be used.

The external apparatus 301 also includes, for example, a control unit 411, a storage unit 404, a GPS reception unit 405, a display unit 407, an operation unit 408, an audio input/audio processing unit 409, and a power source unit 410. The control unit 411 controls the external apparatus 301 by executing a control program stored in the storage unit 404. The storage unit 404 stores, for example, the control program to be executed by the control unit 411 and various kinds of information such as communication parameters. Various operations (described below) are implemented by the control unit 411 executing the control program stored in the storage unit 404.

The power source unit 410 supplies power to the external apparatus 301. The display unit 407 has a function of outputting visually recognizable information using, for example, a liquid crystal display (LCD) or an LED, or outputting a sound using a speaker or any other device, and displays various kinds of information. The operation unit 408 includes, for example, a button (not illustrated) for receiving a user operation on the external apparatus 301. The display unit 407 and the operation unit 408 can be formed by a common member such as a touch panel.

The audio input/audio processing unit 409 can be configured to acquire a user's voice by using a general-purpose microphone integrated into the external apparatus 301, and identify a user's operation instruction via voice recognition processing. The audio input/audio processing unit 409 also acquires an audio command uttered by the user's voice via a dedicated application in the external apparatus 301. The acquired audio command can be registered as a specific audio command to be recognized by the audio processing unit 214 of the camera 101 via the first communication 302 using wireless LAN.

The GPS reception unit 405 receives a GPS signal and analyzes the GPS signal to estimate the current position (the longitude and latitude information) of the external apparatus 301. Alternatively, the GPS reception unit 405 can estimate the current position of the external apparatus 301 based on information about surrounding wireless networks, using a Wi-Fi® Positioning System (WPS). In a case where the acquired current GPS position information is within a preset position range (within a predetermined radial range centering on the detection position), or the GPS position information indicates a position change greater than or equal to a predetermined value, the external apparatus 301 notifies the camera 101 of movement information via the Bluetooth® Low Energy control unit 402. The movement information is used as a parameter for the automatic image capturing (described below) or automatic editing.

As described above, the camera 101 and the external apparatus 301 exchange data with each other using the wireless LAN control unit 401 and the Bluetooth® Low Energy control unit 402. For example, the camera 101 and the external apparatus 301 transmit and receive data, such as audio signals, image signals, compressed audio signals, and compressed image signals. The external apparatus 301 transmits, to the camera 101, an image capturing instruction, audio command registration data, a predetermined position detection notification based on the GPS position information, and a location movement notification. The external apparatus 301 also transmits and receives learning data using the dedicated application in the external apparatus 301. The dedicated application also functions to display a Graphical User Interface (GUI) for viewing the images in the camera 101 and changing settings of the camera 101 via the display of the external apparatus 301 in the case where the camera 101 does not include a display.

The camera 101 according to the present exemplary embodiment has two methods for establishing a wireless LAN connection with the external apparatus 301.

The first connection method is to switch from Bluetooth® Low Energy to wireless LAN. When the communication button of the camera 101 is short-pressed in a state (a power-on state) where the power supply to the camera 101 is completed, the camera 101 starts transmitting a Bluetooth® Low Energy advertisement packet. The external apparatus 301 scans and receives this advertisement packet and, in response to the packet, transmits a connection request to the camera 101.

When the camera 101 permits the connection request, the camera 101 and the external apparatus 301 are connected with each other via Bluetooth® Low Energy. Once the connection has been established, the camera 101 and the external apparatus 301 store each other's information. This state is referred to as a pairing state. In a case where the camera 101 is powered on in the pairing state, the camera 101 starts transmitting the advertisement packet without waiting for the pressing of the communication button. When the external apparatus 301 scans and receives the advertisement packet, the camera 101 can automatically establish a Bluetooth® Low Energy connection with the external apparatus 301.

During a transition to the pairing state, the camera 101 shares wireless LAN communication parameters (a Service Set Identifier (SSID) and a password) generated by the camera 101 with the external apparatus 301 via Bluetooth® Low Energy. The shared SSID and password are stored in the external apparatus 301 until the pairing state is canceled. Holding down the power button and the communication button of the camera 101 at the same time enables the camera 101 to cancel the pairing state.

When the dedicated application is activated on the external apparatus 301 and displayed on the foreground in a state where the Bluetooth® Low Energy connection is established with the camera 101, the external apparatus 301 transmits a request for activating wireless LAN to the camera 101 via Bluetooth® Low Energy under the control of the dedicated application. Upon receipt of the request, the camera 101 ends the Bluetooth® Low Energy communication and starts transmitting a wireless LAN beacon. The beacon includes the SSID shared via Bluetooth® Low Energy.

Upon receiving the beacon, the external apparatus 301 transmits a request for participating in the wireless LAN created by the camera 101 to the camera 101. When the participation request is accepted by the camera 101, the external apparatus 301 participates in the wireless LAN created by the camera 101. Then, through connection establishment processing in the application layer, the camera 101 and the external apparatus 301 establish a wireless LAN connection.

The second connection method will now be described.

The camera 101 has a function of creating a wireless LAN without using Bluetooth® assuming a case where the external apparatus 301 is not provided with Bluetooth®. By holding down the communication button in a state where the camera 101 is powered on and is not connected with the external apparatus 301, the user can switch the camera 101 to a mode of creating a wireless LAN without using Bluetooth®. Holding down the communication button in this manner switches the mode of the camera 101 and powers off the camera 101 temporarily. The user operates the power button of the camera 101 again to power on the camera 101, and then short-presses the communication button. When the user performs these operations, the camera 101 activates a wireless LAN function and starts the beacon transmission, instead of starting the transmission of a Bluetooth® Low Energy advertisement packet.

At this time, the beacon includes a default fixed SSID. When the user of the external apparatus 301 inputs the SSID using an input member of the external apparatus 301, the external apparatus 301 transmits a request for participating in the wireless LAN with the input SSID to the camera 101. When the participation request is accepted by the camera 101, the external apparatus 301 participates in the wireless LAN created by the camera 101. Then, through the connection establishment processing in the application layer, the camera 101 and the external apparatus 301 establish a wireless LAN connection.

Even in a case where the camera 101 has already been paired with the external apparatus 301 or another external apparatus, e.g., a smartphone, the user can switch the mode by holding down the communication button and then establish a wireless LAN connection using the wireless LAN function without using Bluetooth®.

In the present exemplary embodiment, after wireless communication is established with the external apparatus 301 via wireless LAN (WLAN), the communication button can be assigned the function of an image capturing instruction button for inputting an image capturing instruction. The assignment of this function is performed via a GUI of the dedicated application installed on the external apparatus 301. When the camera 101 receives, from the dedicated application of the external apparatus 301, an instruction for assigning, to the communication button, the function of the image capturing instruction button for inputting an image capturing instruction, the camera 101 enables a function of receiving the image capturing instruction via the communication button.

As described above, in a case where the camera 101 is not in the pairing state or is in the mode of creating a wireless LAN without using Bluetooth®, the communication button performs the original function. Thus, even if the communication button is assigned the function of receiving an image capturing instruction, this setting is ignored in a case where the camera 101 is not in the pairing state or is in the mode of creating a wireless LAN without using Bluetooth®. In other words, in such a case, the communication button returns to the original function.

<Image Capturing Operation Sequence>

Figure 5:
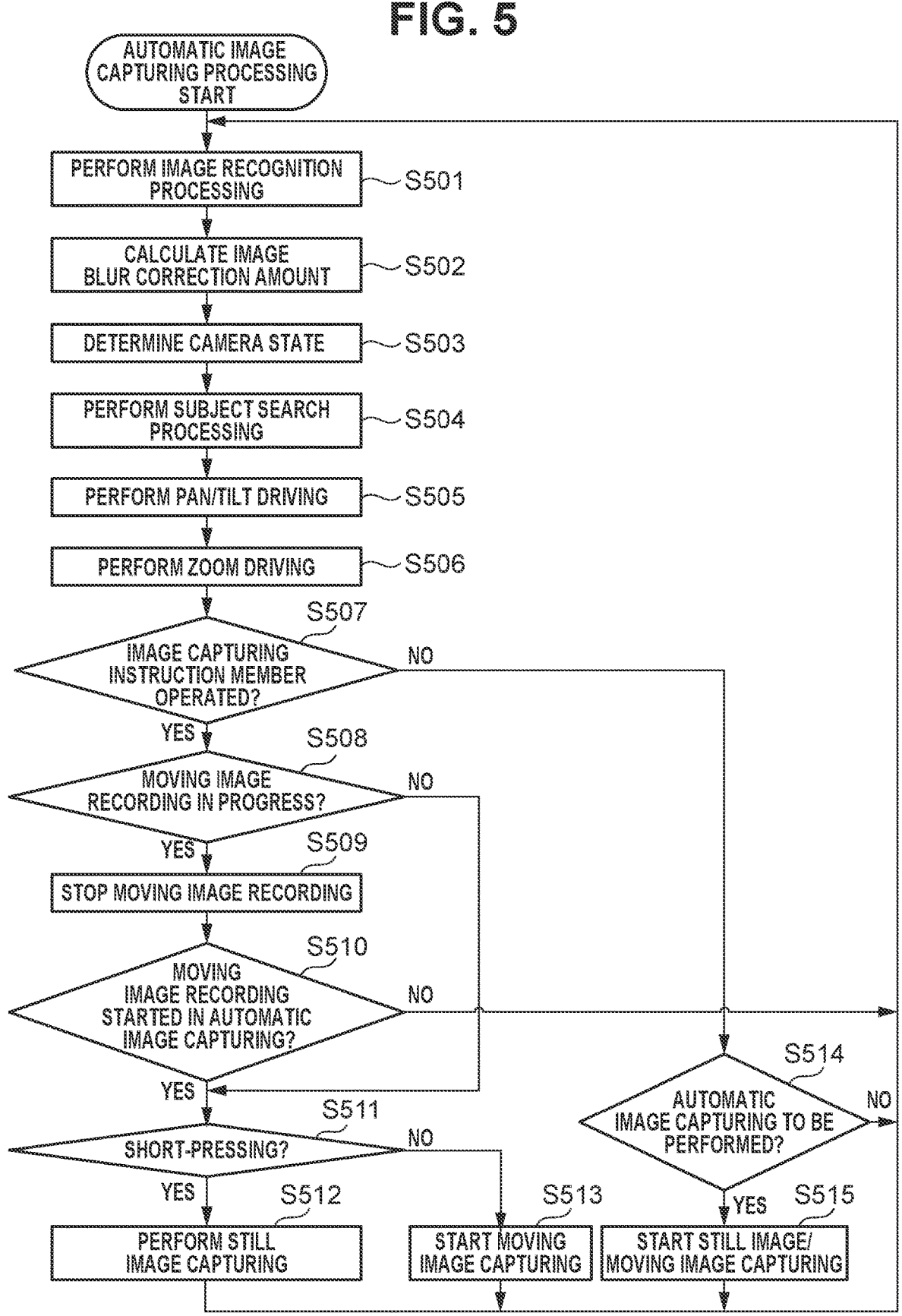
FIG. 5 is a flowchart illustrating automatic image capturing processing and manual image capturing processing by the image capturing apparatus.

FIG. 5 is a flowchart illustrating automatic image capturing processing and manual image capturing processing by the camera 101 according to the present exemplary embodiment.

The camera 101 according to the present exemplary embodiment starts the processing in this flowchart when the user operates the power button on the camera 101 to switch the power button from an on state to an off state. In the present exemplary embodiment, it is assumed that the communication button of the camera 101 is assigned the function of receiving an image capturing instruction in advance and the communication button functions as the image capturing instruction button. Processing of each step in the flowchart is implemented by the first control unit 223 controlling the components of the camera 101. A function for the automatic image capturing can be turned on or off by an operation from the dedicated application on the external apparatus 301.

In step S501, the image capturing unit 206 forms an image to generate a signal, and the image processing unit 207 subjects the signal to image processing to generate an image for subject detection. The image processing unit 207 subjects the image to subject detection processing to detect a person or an object.

When detecting a person, the image processing unit 207 detects the face or body of the subject. In face detection processing, a pattern for identifying a person's face is predefined, and a region matching this pattern in the captured image can be detected as the face region of the person.

At the same time, the image processing unit 207 calculates the reliability indicating the probability of the face region being the subject's face. The reliability is calculated based on, for example, the size of the face region in the image and the degree of matching with the face pattern. Also in object recognition processing, an object matching a pre-registered pattern can be recognized.

A method of extracting a characteristic subject also includes using a histogram of the hue or saturation in the captured image. Processing is performed to divide the image of subjects captured in the imaging angle of view into a plurality of sections based on the distribution derived from the histogram of the hue or saturation, and classify the captured image on a section-by-section basis. For example, a histogram of a plurality of color components is generated for the captured image. The captured image is sectioned based on the mound-shaped distribution range of the histogram, and is classified in regions where the same sections are combined. Then, subject image regions are recognized. By calculating an evaluation value for each of the recognized subject image regions, the subject image region having the highest evaluation value can be determined as a main subject region. The above-described method enables obtaining information about each subject from image capturing information.

In step S502, the first control unit 223 calculates an image blur correction amount. More specifically, the first control unit 223 calculates the absolute angle of the shake of the camera 101 based on the angular velocity and acceleration information acquired by the apparatus shake detection unit 209. Then, the first control unit 223 obtains an image blur correction angle by moving the tilt rotation unit 104 and the pan rotation unit 105 in the angular direction for canceling the absolute angle, and sets the image blur correction angle as the image blur correction amount. The calculation method in the processing for calculating the image blur correction amount can be changed through learning processing (described below).

In step S503, the first control unit 223 determines the state of the camera 101. The first control unit 223 determines the current vibration and movement state of the camera 101 based on the angle and movement amount of the camera 101 detected based on the angular velocity information, the acceleration information, and the GPS position information. For example, in a case where the camera 101 is attached to an automobile to capture an image, subject information such as surrounding scenery can vary significantly depending on the distance moved. The first control unit 223 determines whether the camera 101 is in a "vehicle moving state" where the camera 101 is attached to an automobile and is moving at a high speed. This determination result can be used for the automatic subject search (described below). The first control unit 223 also determines whether the angle of the camera 101 changes largely to determine whether the camera 101 is in a "stationary image capturing state" where the camera 101 hardly shakes. If the camera 101 is in the "stationary image capturing state", the camera 101 itself is assumed to have no position change, and the first control unit 223 can perform the subject search for the stationary image capturing state. If the angle change of the camera 101 is relatively large, the first control unit 223 determines that the camera 101 is a "hand-held state" and can perform the subject search for the hand-held state.

In step S504, the first control unit 223 performs subject search processing. The subject search includes the following processes (1) to (3).

Figure 6A:
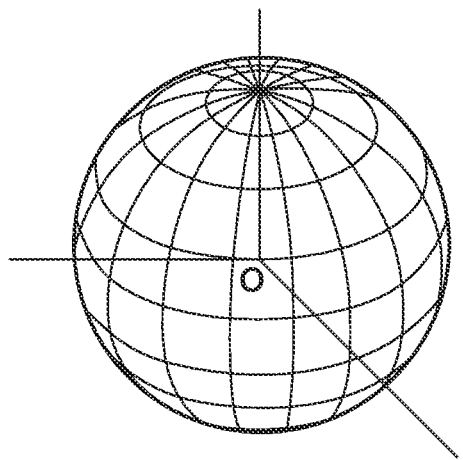
FIGS. 6A to 6D are diagrams illustrating area division in a captured image.
Figure 6B:
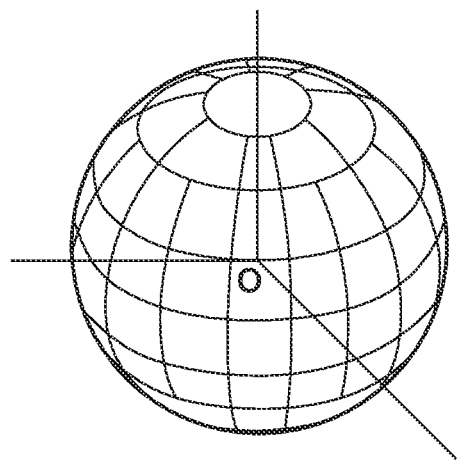

(1) Area Division:

Area division will be described with reference to FIGS. 6A, 6B, 6C, and 6D. As illustrated in FIG. 6A, the area division is performed over the entire circumference centering on the position of the camera 101 (using an origin O as the position of the camera 101). In the example of FIG. 6A, the area division is performed at intervals of 22.5 degrees in each of the tilt and pan directions. In the area division in FIG. 6A, the horizontal circumference decreases to decrease the area region as being further away from 0 degrees in the tilt direction. Thus, the horizontal area range is set to more than 22.5 degrees when the tilt angle is 45 degrees or more, as illustrated in FIG. 6B.

Figure 6C:
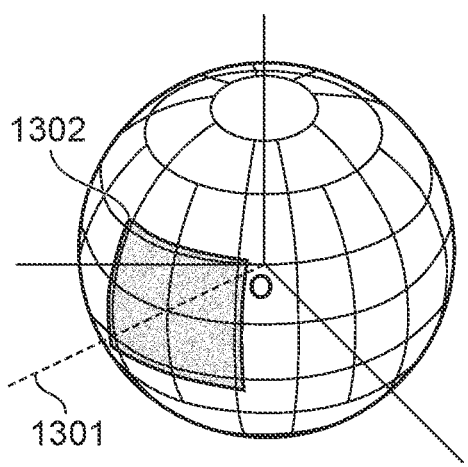
Figure 6D:
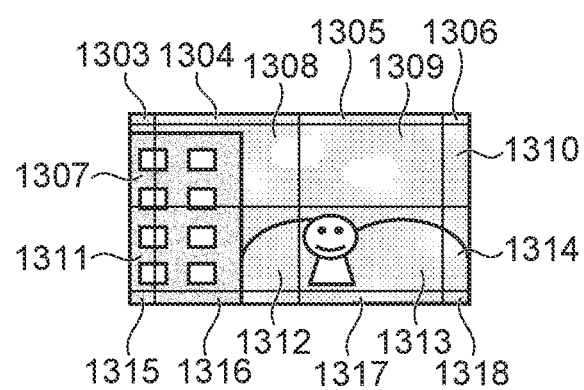

FIGS. 6C and 6D illustrate an example of a region divided into areas in the imaging angle of view. An axis 1301 is the orientation of the camera 101 at the time of initialization. The area division is performed using this direction as a reference position. FIG. 6C illustrates an example of an image captured in an angle-of-view area 1302. In the angle-of-view area 1302, the captured image is divided into areas 1303 to 1318 illustrated in FIG. 6D, based on the area division.

(2) Importance Level Calculation for Each Area:

For each area obtained by the division as described above, the importance level indicating the priority in the subject search is calculated based on the states of a subject and a scene existing in the area. The importance level based on the subject state is calculated, for example, based on the number of persons in the area, the face size and orientation of each person in the area, the probability of face detection, the facial expression of each person in the area, and the personal authentication result on each person in the area. The importance level based on the scene state is calculated, for example, based on a general object recognition result, a scene determination result (including blue sky, backlight, and evening view), a sound level and a voice recognition result from the area direction, and information about movement detection in the area.

In a case where the vibration of the camera 101 is detected in the camera state determination (step S503 in FIG. 5), the importance level may be changed depending on the vibration state. For example, if the camera 101 is determined to be in the "stationary image capturing state", the first control unit 223 determines to perform the subject search focusing on a subject with a high priority (e.g., a camera owner) among the subjects registered in the face authentication. The automatic image capturing (described below) is also performed giving a high priority to the face of the camera owner, for example. As a result, even if the camera owner carries the camera 101 to capture images over a long time, placing the camera 101 on a desk enables recording many images of the owner. At this time, the face search can be performed through panning and tilting, and thus the owner can record images of the owner or group images including many faces by simply placing the camera 101 without considering the angle of the camera 101.

With the above-described conditions, the same area has the highest importance level as long as each area remains unchanged. As a result, the search target area remains unchanged.

For this reason, the importance level is changed based on the past image capturing information. More specifically, the importance level may be lowered for the area that has been specified as the search area for a predetermined time period, or the importance level may be lowered for a predetermined time period for the area subjected to moving image capturing in step S513 (described below).

(3) Search Target Area Determination:

After the importance level is calculated for each area as described above, the area having a high importance level is determined as the search target area. Then, a pan/tilt search target angle for keeping the search target area within the angle of view is calculated.

Referring back to FIG. 5, in step S505, the first control unit 223 performs pan/tilt driving. More specifically, the first control unit 223 adds the image blur correction amount and the driving angle based the pan/tilt search target angle in the control sampling frequency to calculate a pan/tilt driving amount. Then, the barrel rotation drive unit 205 controls the driving of each of the tilt rotation unit 104 and the pan rotation unit 105.

In step S506, the first control unit 223 controls the zoom unit 201 to perform zoom driving. More specifically, the first control unit 223 performs zoom driving based on the state of the search target subject determined in step S504. For example, if a person's face as the search target subject is too small in the image and is smaller than the minimum detectable size, the face may fail to be detected and may be lost track of. In such a case, the first control unit 223 performs control to increase the size of the face in the image by zooming the image on the telephoto side. If the person's face is too large in the image, the subject is likely to be out of the angle of view due to the movement of the subject or the camera 101 itself. In such a case, the first control unit 223 performs control to reduce the size of the face in the image by zooming the image on the wide-angle side. Performing zoom control in this way enables maintaining the subject in a state suitable for tracking.

In step S507, the first control unit 223 determines whether an image capturing instruction member is operated to issue an image capturing instruction. If the image capturing instruction member is operated (YES in step S507), the processing proceeds to step S508. The camera 101 according to the present exemplary embodiment includes a button exposed external to the housing of the camera 101. In this step, this button is used as the image capturing instruction member. The user can issue a still image capturing instruction by short-pressing this button. The user can issue a moving image recording start instruction by holding down the button.

In step S508, the first control unit 223 determines whether the camera 101 is recording a moving image. If the camera 101 is recording a moving image (YES in step S508), the processing proceeds to step S509. If the camera 101 is not recording a moving image (is in an image capturing standby state) (NO in step S508), the processing proceeds to step S511. In a case where the camera 101 is recording a moving image, the recording is the one started in the automatic image capturing in step S515 (described below) or the one started based on a user's instruction in step S513 (described below).

In step S509, the first control unit 223 stops the moving image recording and then closes the movie image file being recorded.

In step S510, the first control unit 223 determines whether the stopped moving image recording is the recording triggered by the automatic image capturing, i.e., the recording started in step S515.

A case where the first control unit 223 determines in step S510 that the stopped moving image recording is the recording started in the automatic image capturing will be described first. In this case, the processing proceeds to step S511. In step S511, the first control unit 223 determines whether the operation on the image capturing instruction member determined in step S507 is short-pressing.

If the first control unit 223 determines that the operation on the image capturing instruction member is short-pressing (YES in step S511), the processing proceeds to step S512. In step S512, the first control unit 223 determines that an instruction to perform the still image capturing has been issued, and performs the still image capturing. If the first control unit 223 determines that the operation on the image capturing instruction member is not short-pressing but long-pressing (NO in step S511), the processing proceeds to step S513. In step S513, the first control unit 223 starts the moving image capturing. The moving image recording started in this step is stopped by a user operation or continued until the recording time reaches 29 minutes and 59 seconds.

In a case where the first control unit 223 determines in step S510 that the stopped moving image recording is the recording started in the automatic image capturing, it is very likely that the user does not recognize the moving image recording in progress. Thus, it is considered that the user operates the camera 101 simply with the intention of capturing an image. Thus, in the present exemplary embodiment, if the user manually inputs an image capturing instruction during the moving image recording started in the automatic image capturing, the first control unit 223 stops the moving image recording as well as starts the still image capturing or another moving image recording.

If the first control unit 223 determines that the stopped moving image recording is not the recording started in the automatic image capturing (is the manually started recording) (NO in step S510), the processing returns to step S501 without proceeding to steps S511 to S513. As described above, if the stopped moving image recording is the manually started recording, the first control unit 223 stops the moving image recording without starting the still image capturing or another moving image recording. In a case where the first control unit 223 determines in step S510 that the stopped moving image recording is the recording started based on a manual instruction, the user recognizes the moving image recording in progress. More specifically, it is likely that the user operates the camera 101 with the intention of stopping the moving image recording. Thus, in the present exemplary embodiment, if the user manually inputs an image capturing instruction during the moving image recording started by a manual operation, the first control unit 223 stops the moving image recording and does not perform the image capturing based on the instruction.

If the first control unit 223 determines that no image capturing instruction is issued (NO in step S507), the processing proceeds to step S514. In step S514, the first control unit 223 performs automatic image capturing determination processing to determine whether to perform the automatic image capturing. In the automatic image capturing determination processing, the first control unit 223 determines whether to perform the automatic image capturing (described below). At this time, the focus drive control unit 204 performs automatic focus control. The focus drive control unit 204 also performs exposure control so that the subject has appropriate luminance, using a diaphragm control unit, a sensor gain control unit, and a shutter control unit (which are not illustrated). After the image capturing, the image processing unit 207 performs automatic white balance processing, noise reduction processing, gamma correction processing, and other known image processing to generate an image.

If the first control unit 223 determines that the automatic image capturing is to be performed (YES in step S514), the processing proceeds to step S515. In step S515, the first control unit 223 starts the still image capturing or the moving image recording. In a case where the moving image recording is started, the automatically started moving image recording is continued until the recording is stopped by a user operation or continued until 30 seconds elapse from the start of the recording.

In the present exemplary embodiment, the case where the automatically started moving image recording is stopped upon elapse of a short time compared to the manually started moving image recording has been described as an example. This is based on the concept that priority is given to the user's intention to continue the moving image recording in a case where the recording is manually started, whereas priority is given to suppressing problems related to the processing load and the heating of the housing in a case where the recording is automatically started. However, the present exemplary embodiment is not limited thereto. For example, if the processing speed is sufficient and a sufficient radiation mechanism can be employed for the housing, the automatically started moving image recording can be continued until the recording time reaches 29 minutes 59 seconds as in the case of the manually started moving image recording. Alternatively, in both of the cases, the recording time is limited to 30 seconds, giving priority to the reduction of the processing load.

In a case where predetermined conditions are satisfied at the time of the image capturing, the camera 101 can notify a person as an image capturing target about the image capturing before starting the image capturing. Examples of the notification method include a method of outputting a sound from the audio output unit 218 and a method of lighting the LED using the LED control unit 224. Examples of the predetermined conditions include the number of faces in the angle of view, the degree of smile, the degree of dazzled eyes, the line-of-sight angle and face angle of the subject person, the facial authentication identification (ID) number, the number of persons registered in the personal authentication, the result of general object recognition at the time of the image capturing, the result of scene determination, and the elapsed time from the last image capturing. Examples of the predetermined conditions also include the image capturing time, whether the current position based on GPS information is a scenic spot, the sound level at the time of the image capturing, the presence or absence of a person uttering a voice, and whether applause or cheers are given. Additional examples of the predetermined conditions include vibration information (acceleration information and camera state information) and environmental information (e.g., temperature, air pressure, illuminance, humidity, ultraviolet ray amount). Performing the image capturing with the notification based on the above-described conditions enables capturing images with a desirable line of sight in an important scene. To generate appropriate numbers of still images and moving images, the first control unit 223 can start the fixed-time moving image recording at the next image capturing timing in a case where the number of times of the still image capturing reaches a predetermined value. Alternatively, the first control unit 223 can start the moving image recording upon detecting the timing for recording how the subject's movement changes over time.

<Determination of Whether to Perform Automatic Image Capturing>

The first control unit 223 determines whether to perform the automatic image capturing (the image capturing operation of recording the image data output by the image capturing unit 206) in the following two cases. In a first case, the first control unit 223 determines to perform the automatic image capturing when the importance level exceeds a predetermined value based on the importance level for each area obtained in the subject search processing in step S504. The term "recording" can refer to recording the image data into the memory 215 or to recording the image data into the nonvolatile memory 216. The term "recording" also includes automatically transferring an image to the external apparatus 301 and recording image data into the external apparatus 301.

As described above, in the present exemplary embodiment, the automatic image capturing determination processing is performed to control the image capturing to be automatically performed. However, depending on the situation of the scene or the state of the camera 101, it may be desirable to change the parameter for determining whether to perform the automatic image capturing.

Unlike the image capturing at fixed intervals, in the automatic image capturing control based on the appreciation of the situation, the following (1) to (3) tend to be desired:

(1) Capturing a generous number of images including persons and objects
(2) Avoiding missing a chance to capture images of memorable scenes, and
(3) Capturing images in an energy-saving manner in consideration of the remaining capacity of the battery and the remaining capacity of recording media.

The first control unit 223 calculates an evaluation value based on the subject state and compares the evaluation value with a threshold value. If the evaluation value exceeds the threshold value, the first control unit 223 performs the automatic image capturing. The evaluation value for the automatic image capturing is determined based on previous learning results Referring to an example illustrated in FIG. 7A, the horizontal axis indicates time, and the vertical axis indicates a threshold value for determining whether to perform the automatic image capturing. The automatic image capturing is designed so that the threshold value gradually decreases if a state where the image capturing is not performed lasts for a predetermined time period. Such adjustment is performed based on the following assumption. Even if the subject state is not necessarily suitable for image capturing, performing the image capturing operation a predetermined number of times enables almost-all-around image capturing over the entire image capturing experience.

Figure 7A:
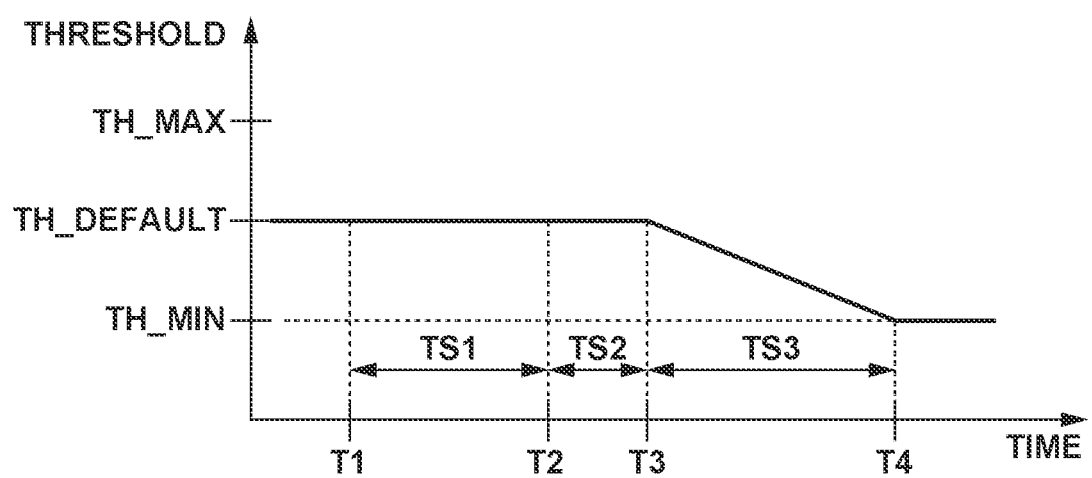

Referring to the example of FIG. 7A, the first control unit 223 measures an elapsed time from the completion of image capturing. After an elapsed time T3 is reached, the first control unit 223 gradually decreases the threshold value from an initial value TH_DEFAULT. With the passing of time, the first control unit 223 further decreases the threshold value to a minimum value TH_MIN. Performing the image capturing at fixed time intervals regardless of the subject state can possibly cause a significant difference from the video image intended by the user. Gradually decreasing the threshold value enables control to capture a video image closer to the one intended by the user.

Figure 7B:
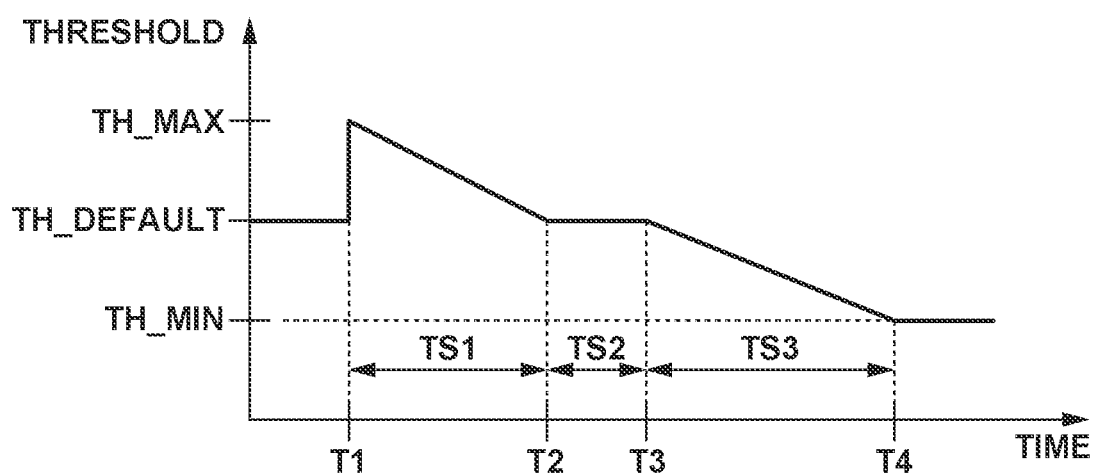

An example illustrated in FIG. 7B indicates a case where the image capturing operation is performed at an elapsed time T1. The first control unit 223 evaluates a change in the evaluation value for the automatic image capturing stored as imaging history information. If the evaluation value has a decrease tendency or changes little, the first control unit 223 sets the threshold value to a maximum value TH_MAX. The first control unit 223 gradually decreases the threshold value over time.

If the evaluation value is determined to have an increase tendency in the image capturing at the elapsed time T1, the first control unit 223 adjusts the threshold value like the example of FIG. 7A, and thus maintains the threshold value at the initial value TH_DEFAULT.

The CPU that controls the camera 101 includes a detection unit for detecting the face of the subject based on image information. The CPU also includes a determination unit that recognizes the facial expression, inputs the state of a specific facial expression (for example, in a case where the feature value of the state of joy, sorrow, anger, or surprise exceeds a threshold value), and calculates the evaluation value to determine whether to perform the automatic image capturing. The CPU includes a control unit that performs a subject recording operation (the automatic image capturing) based on a result of the determination by the determination unit. In this case, the CPU, based on the passage of time and the evaluation value, adjusts the threshold value for determining whether to perform the automatic image capturing. Such adjustment enables, if the evaluation value calculated by the determination unit has an increase tendency, the threshold value to be maintained to capture images of various facial expressions, thereby avoiding missing a chance to capture an image of a desired scene. If the evaluation value changes little or has a decrease tendency, control is performed not to perform the image capturing operation by temporarily increasing the threshold value. This enables avoiding missing a chance to capture an image of a desired scene and reduce the shortage of the recording memory capacity at the same time.

Another example of control will be described with reference to FIG. 7C. In the example of FIG. 7C, the first control unit 223 sets the threshold value to the maximum value TH_MAX during the period from the completion of the image capturing to the reaching of the elapsed time T1. Such adjustment can reduce a problem of an excessive number of similar images due to the image capturing operations being successively performed immediately after the image capturing.

Figure 7D:
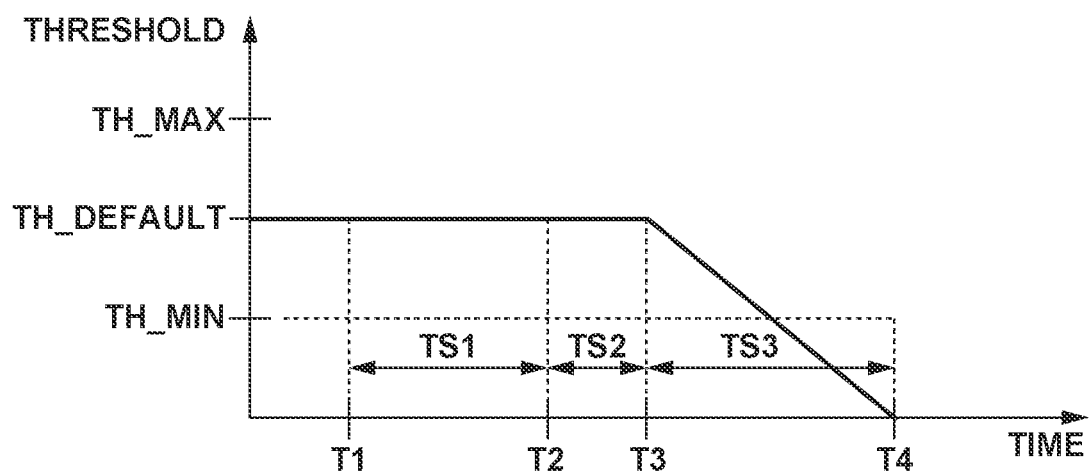

FIG. 7D illustrates an example of control for changing the threshold value based on the result of detecting the shake state of the camera 101. In a case where the user wears the camera 101 as a wearable camera, the user's actions may not be concatenated in time series simply by the image capturing determination based on the automatic image capturing determination processing. In the example of FIG. 7D, after the elapsed time T3 is reached, the first control unit 223 gradually decreases the threshold value, so that the threshold value becomes zero at an elapsed time T4. This means that, if no image capturing operation is performed until the elapsed time T4 is reached, the image capturing operation is to be performed regardless of the evaluation value for the automatic image capturing.

Controlling the image capturing frequency based on the image capturing state in the above-described manner enables performing the automatic image capturing to acquire an appropriate number of captured images.

While the first control unit 223 performs control to change the image capturing frequency based on the image capturing state as described above, the first control unit 223 can perform control to separately store the threshold value for determining whether to perform the still image capturing and the threshold value for determining whether to start the moving image capturing.

While an exemplary embodiment has been described above, this embodiment is not seen to be limiting and can be modified and changed in diverse ways within the ambit of the appended claims.

While in the above-described exemplary embodiment, the example where a button is used as the image capturing instruction member and the operation performed on the button is short-pressing has been described, this is not seen to be limiting. In another exemplary embodiment, instead of operating the button, a tap operation of tapping the housing with a user's finger can be used as a trigger for issuing an image capturing instruction.

When the user taps the housing, the apparatus shake detection unit 209 including the acceleration sensor detects continuous high-frequency acceleration in a short time, so that the first control unit 223 determines that the tap operation is performed as the trigger for issuing an image capturing instruction. For example, tapping the housing once can issue a manual still image capturing instruction, and tapping the housing twice can issue a manual moving image recording instruction. While the user issues a manual image capturing instruction by short-pressing or long-pressing the operation button of the camera 101 in the present exemplary embodiment, the manual image capturing instruction can be implemented with a method other than the method according to the present exemplary embodiment.

The first control unit 223 can receive an image capturing instruction upon detecting a specific touch operation using a touch sensor provided on a surface of the housing of the camera 101.

According to the above-described exemplary embodiment, in a case where the operation member is held down during the automatically started moving image recording, the first control unit 223 stops the moving image recording and then, in response to the operation, starts another moving image recording. This is not seen to be limiting. In another exemplary embodiment, the user's demand level for the timing of the moving image recording can be lower than that for the timing of the still image capturing. Thus, in a case where the operation member is held down during the moving image recording, the first control unit 223 can simply stop the moving image recording regardless of whether the moving image recording has been started automatically or manually.

Even in this case, if the moving image recording is stopped based on the still image capturing instruction issued by short-pressing the operation member, the first control unit 223 changes the subsequent processing depending on whether the stopped moving image recording is the automatically started recording or the manually started recording, as in the above-described exemplary embodiment. More specifically, the first control unit 223 simply stops the moving image recording, or stops the moving image recording and performs the still image capturing.

The above-described exemplary embodiment has been described using the camera 101 illustrated in FIGS. 1A and 3 as an example. This exemplary embodiment is also applicable to a wearable terminal having any other shape. For example, the wearable terminal can include an eyeglasses-like housing and a built-in camera that is oriented in the same direction as that of the user's face. The wearable terminal can be a head mounted display, for example, an optical see-through type head mounted display having a mechanism for superimposing a camera-captured image on the through-the-lens scene surrounding the user by using an optical system such as a prism and a semitransparent mirror. The wearable terminal can also be a video see-through type head mounted display that completely blocks the user's sight from the outside world and displays a camera-captured image on the display.

The camera 101 can include a function of receiving an audio image capturing instruction. In a case where an audio image capturing instruction is input, it is apparent that the user intends to capture an image. Thus, in a case where an audio image capturing instruction is received during the moving image recording, the first control unit 223 stops the moving image recording and performs the image capturing processing regardless of whether the moving image recording is the automatically started recording or the manually started recording. In a case where the user operates the image capturing instruction member during the moving image recording started based on the audio image capturing instruction, the first control unit 223 can stop the moving image recording and perform the image capturing processing.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, these embodiments are not seen to be limiting. The scope of the following claims is to be accorded the broadest interpretation so as to encompass all such modifications and equivalent structures and functions.

This application claims the benefit of Japanese Patent Application No. 2022-018106, filed Feb. 8, 2022, which is hereby incorporated by reference herein in its entirety.

What is claimed is:

1. An image capturing apparatus comprising:
   an operation member configured to receive an operation from a user;
   an image capturing unit including a first function of performing still image capturing in a case where a first operation on the operation member is received, a second function of starting moving image recording in a case where a second operation on the operation member is received, and a third function of automatically starting moving image recording; and
   a control unit configured to, in a case where the first operation is received via the operation member while the third function is performed, perform control to stop the moving image recording by the third function and perform the still image capturing by the first function, and in a case where the first operation is received via the operation member while the second function is performed, perform control to stop the moving image recording by the second function and not perform the still image capturing by the first function.

2. The image capturing apparatus according to claim 1, wherein the control unit is configured to, in a case where the second operation is received via the operation member while the third function is performed, perform control to stop the moving image recording by the third function and start the moving image recording by the second function, and in a case where the second operation is received via the operation member while the second function is performed, perform control to stop the moving image recording by the second function and not start the moving image recording by the second function.

3. The image capturing apparatus according to claim 1, wherein the control unit is configured to, in a case where the second operation is received via the operation member while the third function is performed, perform control to stop the moving image recording by the third function and not start the moving image recording by the second function, and in a case where the second operation is received via the operation member while the second function is performed, perform control to stop the moving image recording by the second function and not start the moving image recording by the second function.

4. The image capturing apparatus according to claim 1, wherein the operation member is a button used to establish wireless communication with an external apparatus, and
   wherein the control unit performs control to wirelessly connect the image capturing apparatus with the external apparatus and enables receiving the first operation and the second operation via the button based on an instruction from the external apparatus.

5. The image capturing apparatus according to claim 1, further comprising:
   a first communication unit configured to communicate with an external apparatus using a first communication method; and
   a second communication unit configured to communicate with the external apparatus using a second communication method enabling a higher-speed communication than the first communication method,
   wherein the second communication unit communicates with the external apparatus using the second communication method and using a communication parameter shared with the external apparatus via the first communication unit.

6. The image capturing apparatus according to claim 1, wherein the automatically started moving image recording is automatically stopped when a predetermined time has elapsed since the moving image recording started.

7. The image capturing apparatus according to claim 1, wherein the moving image recording started in the case where the second operation on the operation member is received is automatically stopped when a predetermined time has elapsed since the moving image recording started.

8. The image capturing apparatus according to claim 1,
   wherein the automatically started moving image recording is automatically stopped when a first time has elapsed since the moving image recording started,
   wherein the moving image recording started in the case where the second operation on the operation member is received is automatically stopped when a second time has elapsed since the moving image recording started, and
   wherein the first time is shorter than the second time.

9. The image capturing apparatus according to claim 1, further comprising an audio input unit configured to acquire audio signals,
   wherein, in a case where the audio input unit acquires an audio image capturing instruction during the moving image recording, the moving image recording is stopped and image capturing is performed based on the audio image capturing instruction.

10. The image capturing apparatus according to claim 9, wherein, in a case where the first operation on the operation member is received during the moving image recording started based on the audio image capturing instruction, the moving image recording is stopped and the still image capturing is performed by the first function.

11. The image capturing apparatus according to claim 1,
    wherein the image capturing unit further includes a pan function, a tilt function, and a zoom function, and
    wherein the image capturing unit tracks a subject using at least one of the pan function, the tilt function, or the zoom function.

12. The image capturing apparatus according to claim 1, wherein the image capturing apparatus does not include a display and includes a function of transmitting a captured image to an external apparatus.

13. The image capturing apparatus according to claim 1, wherein the image capturing apparatus is a head mounted display.

14. The image capturing apparatus according to claim 1, wherein the third function automatically starts the moving image recording in a case where a predetermined condition is satisfied based on an image captured by the image capturing unit.

15. A method for controlling an image capturing apparatus including an operation member and an image capturing unit including a first function of performing still image capturing in a case where a first operation on the operation member is received, a second function of starting moving image recording in a case where a second operation on the operation member is received, and a third function of automatically starting moving image recording, the method comprising:
    performing, in a case where the first operation is received via the operation member while the third function is performed, control to stop the moving image recording by the third function and perform the still image capturing by the first function; and performing, in a case where the first operation is received via the operation member while the second function is performed, control to stop the moving image recording by the second function and not perform the still image capturing by the first function.

16. A non-transitory computer-readable storage medium that stores a program for causing a computer to execute a method for controlling an image capturing apparatus including an operation member and an image capturing unit including a first function of performing still image capturing in a case where a first operation on the operation member is received, a second function of starting moving image recording in a case where a second operation on the operation member is received, and a third function of automatically starting moving image recording, the method comprising:

performing, in a case where the first operation is received via the operation member while the third function is performed, control to stop the moving image recording by the third function and perform the still image capturing by the first function; and performing, in a case where the first operation is received via the operation member while the second function is performed, control to stop the moving image recording by the second function and not perform the still image capturing by the first function.

\* \* \* \* \*